(12) United States Patent
Messier et al.

(10) Patent No.: US 6,246,861 B1
(45) Date of Patent: Jun. 12, 2001

(54) CELLULAR TELEPHONE LOCATION SYSTEM

(75) Inventors: Geoffrey G. Messier, Calgary; Brent R. Petersen, Fredericton; Michel Fattouche, Calgary, all of (CA)

(73) Assignee: Telecommunications Research Lab. (CA)

( * ) Notice: Subject to any disclaimer, the term of this patent is extended or adjusted under 35 U.S.C. 154(b) by 0 days.

(21) Appl. No.: 09/059,720

(22) Filed: Apr. 9, 1998

(30) Foreign Application Priority Data

Nov. 6, 1997 (CA) .................................................. 2220365

(51) Int. Cl.[7] .............................. H04B 7/185; H04Q 7/20; H04Q 7/00; H04Q 7/216; H03D 1/06
(52) U.S. Cl. ......................... 455/12.1; 455/456; 370/330; 370/335; 375/348
(58) Field of Search .................................. 455/456, 12.1; 375/348; 370/335, 330

(56) References Cited

U.S. PATENT DOCUMENTS

| | | | |
|---|---|---|---|
| 5,056,109 | * 10/1991 | Gilhousen et al. | |
| 5,109,390 | * 4/1992 | Gilhousen et al. | |
| 5,208,756 | 5/1993 | Song | 364/449 |
| 5,404,376 | 4/1995 | Dent | 375/200 |
| 5,613,205 | 3/1997 | Dufour | 455/33.2 |
| 5,642,405 | * 6/1997 | Fischer et al. | |
| 5,657,487 | 8/1997 | Doner | 455/456 |
| 5,790,606 | * 8/1998 | Dent | 375/348 |
| 5,799,010 | * 8/1998 | Lomp et al. | 370/335 |
| 5,953,323 | * 9/1999 | Haartsen | 370/330 |
| 5,963,846 | * 10/1999 | Kurby | 455/12.1 |

* cited by examiner

Primary Examiner—William Cumming
(74) Attorney, Agent, or Firm—Stallman & Pollock LLP

(57) ABSTRACT

Apparatus for locating a mobile phone in a cellular phone system, in which the cellular phone system comprises plural base stations, each base station being associated with a cell, and in which the mobile phone is programmed to communicate signal strength of received signals to the base stations. Each base station, has a processing unit operably connected to the plural base stations by first communications links, the processing unit having as input the received signal strength measurements, the processing unit being programmed to operate upon the received signal strength measurements to solve a channel model equation in which the position of the mobile phone and the path loss exponent of the cell are unknowns and produce as output position location signals representing the position of the mobile phone in the cell, and a user interface operably connected to the processing unit by a second communication link for communicating signals indicative of the position of the mobile phone in the cell. Various algorithms may be used to solve the channel model equation. A method of locating a mobile phone by A) communicating signal strength measurements of signals received by the mobile phone to a processing unit; B) operating upon the signal strength measurements with the processing unit to solve a channel model equation in which the path loss exponent and the position of the mobile phone are unknowns.

4 Claims, 3 Drawing Sheets

CELLULAR TELEPHONE LOCATION SYSTEM

FIELD OF THE INVENTION

This invention relates to systems and methods for the location of mobile telephones. BACKGROUND OF THE INVENTION Recently, there has been a great deal of interest in systems that determine the position of cellular telephones. In 1996, the Federal Communications Commission (FCC) in the United States pass a regulation requiring all cellular telephone service providers to provide Enhanced-911 (E911) service by 2001. E911 means that when a cellular phone is used to make an emergency call, the cellular system must be able to determine the physical location of that phone to an accuracy of 125 m, 67% of the time.

A great deal of work has been done in the cellular mobile location field. There have been many solutions proposed for the problem. However, most of these solutions require some modification of the cellular mobiles or base stations. Cellular networks are used extensively around the world. Cellular manufacturers and service providers have invested a great deal of money in the existing systems and standards. Any major modifications to these systems would require a great deal of effort and would cost a considerable amount. This means a solution that will function with the existing cellular systems is much more attractive.

There are several characteristics of a radio signal that can be used to determine the location of its source. Once characteristic is the strength of the signal. The average amplitude of a radio signal decays exponentially to the distance between the source of the signal and the point of reception. If the mobile were to monitor the strengths of known signals, transmitted from several known locations, those strength measurements could be used to determine the location of the phone. There are several patents that disclose location systems based on this principle.

P. W. Dent discloses his system in U.S. Pat. No. 5,404,376. In this system, each base station transmits location information to the mobiles. This information consists of a table or contour of received strength of the signal from that base station vs. distance. The mobile measures the received signal strength from a base station and then uses the information it receives from that station to determine its distance from it. The mobiles also transmit back their signal strength measurements to the base stations who use them to update their contours. The disadvantage of this system is that it requires extensive modifications of the mobile and the base stations.

Han-Lee Song discloses a different location system in U.S. Pat. No. 5,208,756. His system uses a location device placed in a vehicle that monitors the strengths of the signals received from the surrounding base stations. The strength of a radio signal decays with the distance from the transmitter, according to an exponential factor. The system assumes that this path loss exponent and the transmit power for each base station is known before-hand from measurements or calculation. That information is stored in the memory of each location device. The device Uses the log-distance channel equation to solve for the distances from the base stations to the mobile. It then uses the distances to triangulate the mobile's location. There are three disadvantages with this system. First, additional equipment or some modification of the mobile is required. Second, the device uses the same equation to model all channels. Radio channels vary a great deal which makes characterizing them with a single equation very difficult. Finally, the path loss exponent for each base station can vary considerably, depending on location in the cell. Approximating this with a single value will result in errors in the system. Also, if there is any change in the path loss exponent values, the memory in every one of the location devices will have to be updated.

Unlike the first two systems, the system disclosed by D. Dufor in U.S. Pat. No. 5,613,205 does not require the modification of the mobile. It uses signal strength measurements taken by the mobile that are used for another function. The System forces the mobile to sequentially go into handoff with each of its neighboring cells. It then Uses the signal measurements the mobile takes of the base stations as a result of the handoffs to determine the location of the phone. The distances from each of the base stations are calculated and the mobile position is found using triangulation. The disadvantage of this system is the added complexity of forcing the cellular phone to perform several unnecessary handoffs. This method could also cause degradation in call quality and would not work if the mobile had only a small number of nearby cells. It also increases the probability of a dropped call.

The system disclosed by J. R. Doner in U.S. Pat. No. 5,657,487 also does not require modification of the mobile. It uses the signal strength readings the mobile takes of its surrounding base stations for Mobile Assisted Handoff (MAHO). It also uses transmission time advance information for each mobile to determine location. This system divides the cell into large contour regions based on signal strength measurements taken in the area. The MAHO measurements taken by the mobile are used to map it into a specific location using the contour regions. The location is further refined by constraining the position estimate to lie on known service areas, like roads. The disadvantage of this system is that it requires extensive signal strength measurements to be made in the area. Another disadvantage is that in order to constrain the position estimate to a known service area, the topology of each cell must be surveyed in detail and stored.

SUMMARY OF THE INVENTION

The invention provides a location system that uses signal strength measurements taken by a cellular mobile to determine the location of that mobile. In many cellular systems, the mobiles already measure the strength of signals received from surrounding base stations. This information can be used for operations like Mobile Assisted Handoff (MAHO). Since this feature is already incorporated into several digital cellular systems, the invention requires no modification of the mobiles or the base stations.

In order to determine the location of the mobile, an appropriate equation model is used for the channel to express the signal strength measurements taken by the mobile as a function of the mobile's (x,y) position and the path loss exponent of the channel. There are several channel equations available that are suited for specific topologies. The most appropriate equation is selected for each cell. The signal strength measurements from the mobile are used in these equations to solve for the mobile's position and the path loss exponent of the channels. Several algorithms exist for solving these signal strength equations. If the algorithm needs a guess for the initial values of the position and path loss exponent, a prediction algorithm is used to determine accurate initial values based on the previous solutions of the signal strength equations.

The power of a signal in a radio channel decays exponentially with distance from the transmitter. The exponential factor in this decay is the path loss exponent. The path loss exponent is different for different channels and will vary, depending on the location of the mobile. By solving for the path loss exponent, variation between locations is taken into account. This allows accurate position estimates to be made for a variety of different locations in the cellular system. The results are much better than if a single path loss exponent was assumed for the entire cell. This also makes detailed measurements of the cellular coverage area unnecessary. Only a brief survey of each cell is required to determine which channel model will produce the best results for that cell.

There are several other aspects of the invention that provided enhanced mobile phone location. The processing unit may be programmed to request measurements for a specific mobile from the cellular system. The effects of channel fading can be reduced by having the mobile take several readings from each base station over a small area. The readings are then averaged and the average is used in the signal strength equations. Also, assuming a single path loss exponent for all the channels between the mobile and the base stations can be inaccurate. To reduce this error, the base stations can be divided into groups and a path loss exponent value can be solved for each of the groups. The number of groups will depend on the number of measurements taken by the mobile.

Other aspects of the invention accommodate problems presented by a practical cellular system. Directional antennas are often used to divide cells into regions called sectors. Using the radiation patterns and orientations of the antennas, the gain of these antennas can be determined by the processing unit and used in the signal strength equations. Also, a curve fitting algorithm could be used on the position estimates made by the processing unit to find the mobile path that best satisfies all the estimates. This would reduce the error in the estimated mobile path. Often, errors in the position estimate will be caused by only one or two base stations that have become obstructed. Solving for position several times, each time excluding different base station signal strength measurements, will help reduce the effect of the obstructed base station. Finally, there will be times when the algorithm attempting to solve the signal strength equations diverges and gives a very unreasonable solution. The prediction algorithm used to find the initial guesses for position and path loss exponent can be used to identify divergent solutions. If a solution is found to be divergent, it is discarded and not used. This same approach can be used to discard signal strength measurements that are obviously in error.

These and other aspects of the invention are described in the detailed description of the invention and claimed in the claims that follow.

BRIEF DESCRIPTION OF THE DRAWINGS

There will now be described preferred embodiments of the invention, with reference to the drawings, by way of illustration only and not with the intention of limiting the scope of the invention, in which like numerals denote like elements and in which.

DETAILED DESCRIPTION OF PREFERRED EMBODIMENTS

Figure 1:
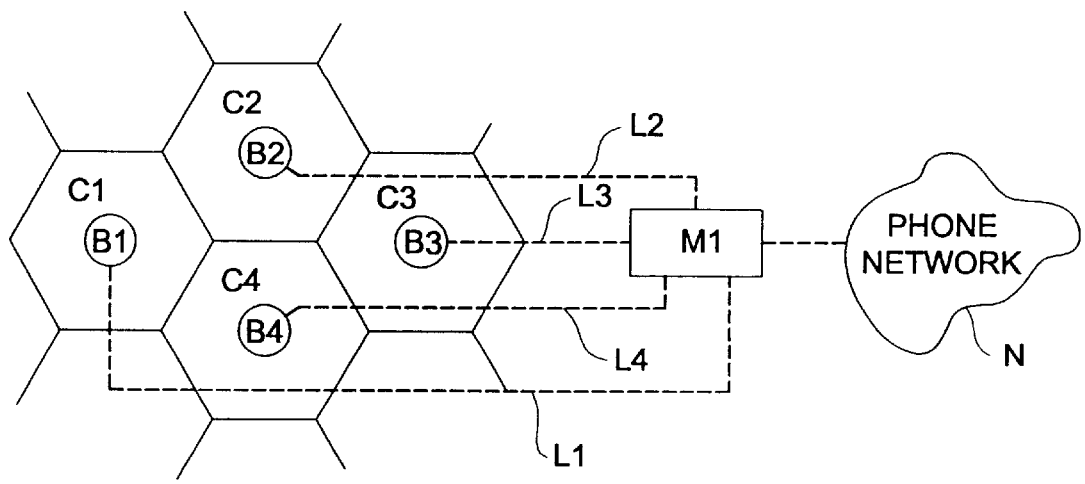
FIG. 1 is a block diagram of a typical cellular telephone system in which communication land lines are indicated by dotted lines.

A typical cellular telephone system is shown in FIG. 1. The system consists of a large area divided into several smaller, contiguous areas called cells C1–C4. In theory, cells are considered to be hexagonal but in reality, they will be irregularly shaped. In each cell, there is a base station labelled B1–B4 respectively, that communicates with all the cellular mobiles in its cell. Each base station is connected to the Mobile Switching Center M1 (MSC), also called the Mobile Telephone Switching Office (MTS), by land communications links L1–L4 respectively. The cellular traffic from each base station B1–B4 is directed to the MSC MI. The MSC M1 serves to connect the cellular network to the main telephone network N.

Figure 1A:
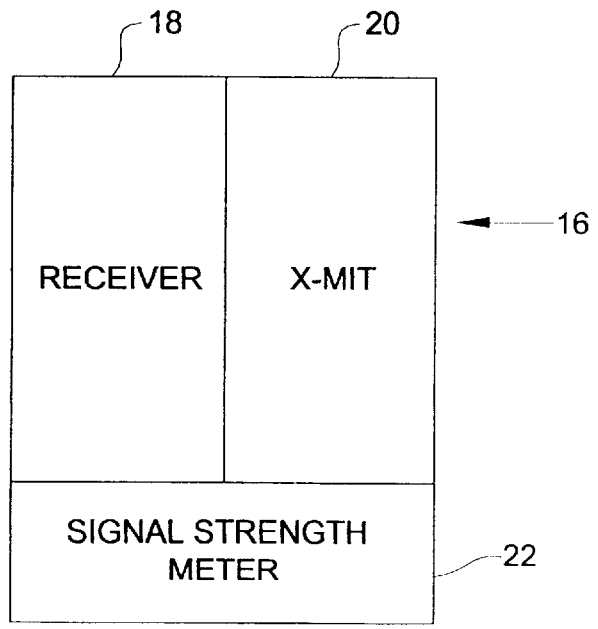
FIG. 1A is a schematic of a conventional mobile phone which may be used in association with the apparatus of the invention.

A convention mobile phone 16 is shown in FIG. 1A. The mobile phone 16 incorporates a receiver 18, a signal strength meter 22 operably connected to the receiver 18 for detecting the strength of signals received by the receiver 18, and a transmitter 20 operably connected to the signal strength meter for transmitting received signal strength measurements to the respective base station B1–BN in which the mobile phone 16 is located. The mobile phone 16 is entirely conventional and numerous such models are commercially available.

When a mobile 16 leaves one cell and enters a neighbouring cell, a handoff occurs. A handoff means that as the mobile phone 16 is making the transition from its current cell into a new cell, it stops communicating with the base station in the cell it is leaving and starts communicating with the base station in the new cell. Often, the mobile phone 16 will assist in the handoff procedure. This is called Mobile Assisted Handoff (MAHO). Typically, the mobile phone 16 will measure the strengths of the signals it is receiving from all the surrounding base stations, eg B2–B4. It then sends those measurements to its base station which can, in turn, forward them to the MSC M1. These measurements are used to determine if the mobile phone 16 is making the transition into a new cell and is a candidate for handoff.

Equations for the signal strength measurements the mobile phone 16 takes from each base station can be written using an appropriate channel model for each cell. The model that will give the most accurate results for the channel can vary, depending on the cell terrain. Some examples of channel models are the log-distance path loss model (T. S. Rappaport, Wireless Communications, Principles and Practice, Prentice Hall, 1996), Lee's Model (W. C. Y. Lee, Mobile Communications Engineering, McGraw-Hill, 1982) or Maciells Model (L. R. Maciel, H. L. Bertoni and H. H. Xia, "Unified approach to prediction of propagation over buildings for all ranges of base station antenna height", IEEE Trans. Veh. Technol. Vol. 42, pp. 41–45, February 1993), the content of all of which references are hereby incorporated by reference. In general, these models predict the received power of a radio signal as a function of the distance between the transmitter and receiver and the path loss exponent. The received power of a radio signal will decay exponentially with distance. The exponential constant of this decay is called the path loss exponent. The value of this constant will depend on the condition of the channel. For a typical cellular system area, it could vary anywhere between the values of 2 and 4. There will also be some constants in each model equation that will depend on the antennas, the terrain, and other features of the cell.

Figure 2:
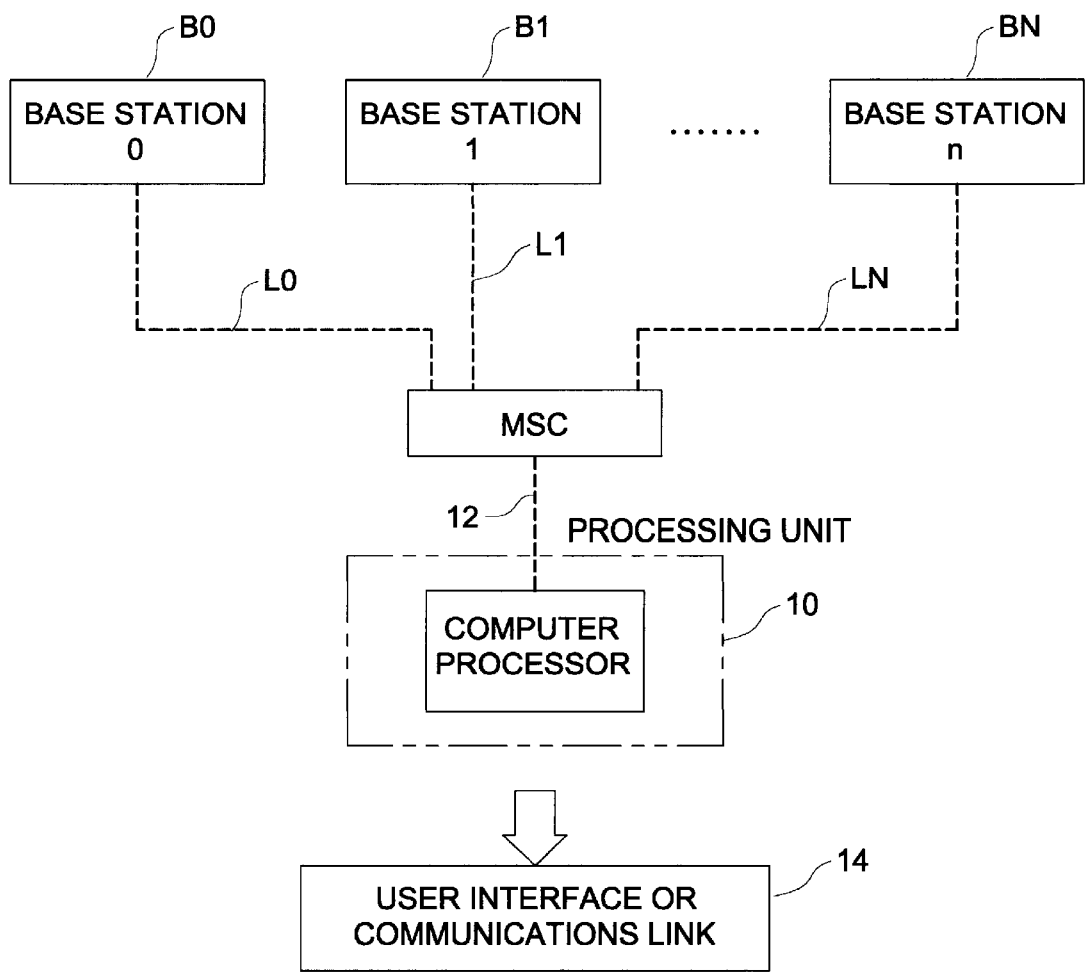
FIG. 2 is a block diagram of a first embodiment of the invention, in which the thick dashed lines indicate a communications land link between the connection blocks, and the processing unit includes all blocks shown inside the dotted box.
Figure 3:
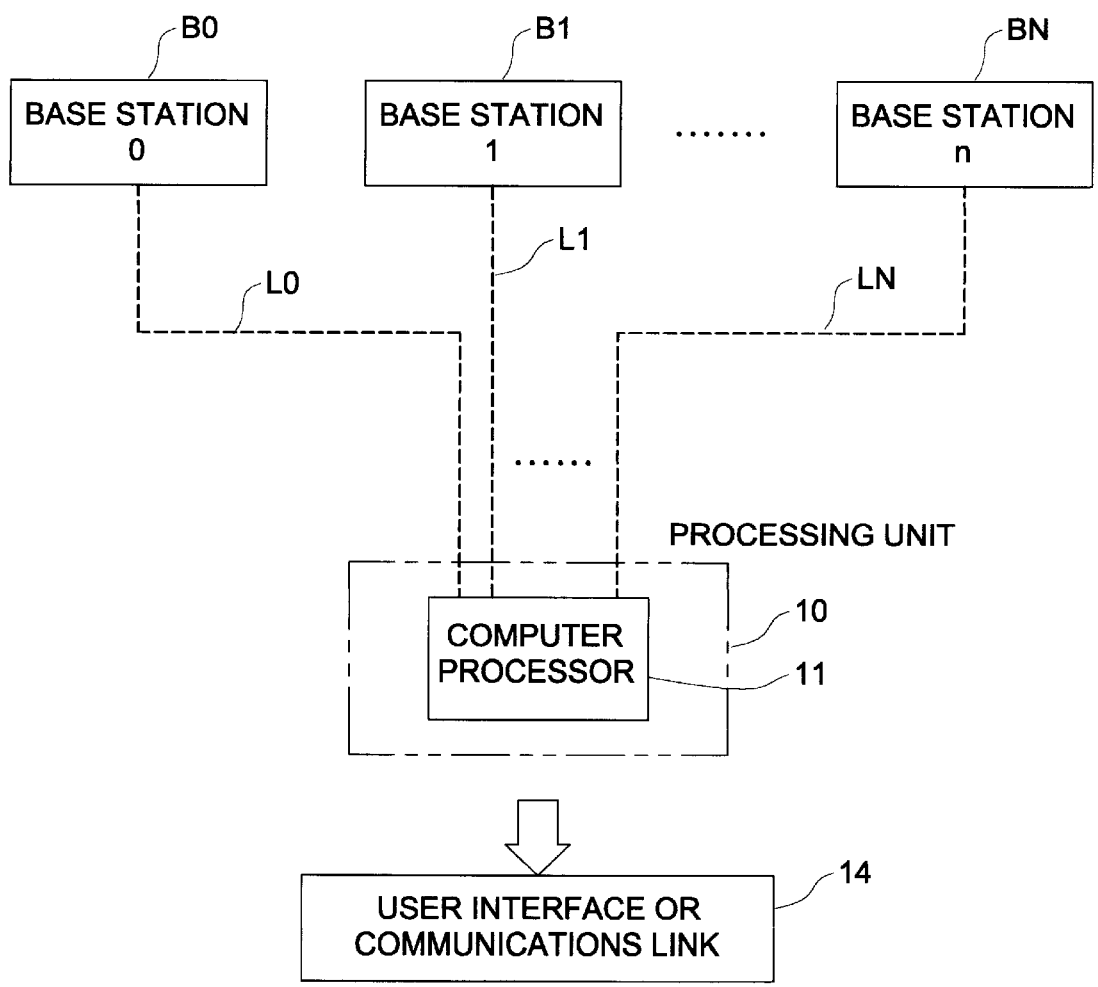
FIG. 3 is a block diagram of a second embodiment of the invention, in which the thick dashed lines indicate a communications land link between the connection blocks, and the processing unit includes all blocks shown inside the dotted box.

The basic structure of a system for implementing the invention is shown in FIG. 2. The implementation has a processing unit 10 connected to the MSC MI by a digital communications link 12. As part of the cellular network, the base stations B0, B1, BN are also connected to the MSC M1 by communications links L0, L1, . . . LN. Along with the other cellular traffic, the base stations B0-BN return the signal strength measurements taken by each mobile phone 16 to the MSC M1. These measurements are sent by the MSC MI to the processing unit 10 over the communications link 12. If the signal strength measurements are not returned by the base stations B0–BN to the MSC M1, then the processing unit 10 would be connected to each of the base stations B0-BN by communication links L0–LN, as shown in FIG. 3. These links L0–LN are used to get the signal strength measurements from the base stations B0–BN directly.

The processing unit 10 uses the base station signal strength measurements taken by each mobile phone 16 to determine the location of that mobile phone 16. The processing unit 10 consists of a computer processor 11, connected to the communications links L0–LN that are used to receive the mobile signal strength measurements from the base stations B0–BN directly or through the MSC M1. These communications links L0–LN may be serial data cables or ethernet connections, for example. The computer processor 11 may be a digital signal processing chip or a high speed personal computer or workstation. The processing unit 10 will have a user interface 14 to communicate the positions of each of the mobiles, once they have been calculated. That interface 14 may be a computer monitor or another communications link. The software run on the computer processor 11 uses the base station signal strength readings taken by the mobile phone 16 as input and outputs the position of the mobile phone 16. In order to perform this function, the software implements the algorithm described in detail in the remainder of this section.

The disclosure in the rest of this section makes use of basic numerical methods and linear algebra techniques. Anyone of average skill in this area will be able to use the description below to implement the software used by the processing unit 10.

After the signal strength measurements taken by the mobile phone 16 are received by the processing unit 10, equations for each of the measurements are formed. An equation is formed that is a function of the unknown distance between the base station and the mobile phone 16 and the unknown path loss exponent of the channel. Since the position of each of the base stations B0–BN is known, the distance becomes a function of the (x,y) position of the mobile phone 16.

When forming an equation for the received signal strength measurement of a particular base station, a channel model equation is preferably selected so that it is the most accurate for the terrain in the base station's cell. This means that different base station readings could have different equations. However, all equations will be functions of three unknowns: the mobile's x position, the mobile's y position and the path loss exponent. The terrain of each cell is examined beforehand to determine what channel model would produce the most accurate results for measurements of the base station in that cell. This information is stored in the processing unit.

Once the equations have been formed for the measurements taken by the mobile phone 16, the measurement values can be used in the equations to solve for the (x,y) position of the mobile phone 16 and the path loss exponent. The values of the signal strength measurements are highly dependent on the path loss exponent. Its value will vary depending on the condition of the channel between the mobile phone 16 and the base stations and the location of the mobile phone 16. Solving for the path loss exponent allows the processing unit 10 to produce accurate results for a wide range of channels and locations. Once the mobile location and path loss exponent is solved for, it is either communicated to the user through the user interface 14 or sent to another device using a communications link.

There are several algorithms capable of solving the signal strength equations for the location of the mobile phone 16. One example is Taylor-series estimation (W. H. Foy, "Position-Location Solutions by Taylor-Series Estimation", IEEE Trans. Aerospace and Electronic Sys., vol. AES-12, pp. 187–93, March 1976). The most robust technique is preferably used to solve the signal strength equations for each particular set of equations. Depending on the different channel models used, the processing unit 10 may use more than one technique for solving the equation sets.

Some of the algorithms for solving the signal strength equations require an initial guess as to the location of the mobile phone 16 and the value of the path loss exponent. The algorithms then start at these values and iterate towards a final solution. When initial values are required, a prediction algorithm may be used to produce them. Based on previous solution values for mobile position and the path loss exponent, which may be values calculated for the same mobile phone 16 or another mobile phone in the same call that have been stored in the processing unit 10, the prediction algorithm produces an estimate of what the current position and exponent values should be. Those values are then used as initial guesses for the algorithm that solves the channel equations. An example of a prediction algorithm that would work is the Kalman filter but any appropriate prediction algorithm could be used by the processing unit 10.

Other methods may also be used to find initial guess values for the location of the mobile phone 16. For example, the mobile phone 16 takes signal strength measurements from all the base stations around it. These base stations can be used to define an area. The mobile phone 16 is assumed to be in the approximate center of that area and the center is used as an initial guess for the location of the mobile phone 16.

In some cellular systems, the mobile phone 16 does not take a simple reading of the received signal power of the base station. Instead, the mobile phone 16 returns a ratio. The numerator is the received signal power of the base station. The denominator can be the noise power received at that location. This type of measurement is called a signal-to-noise ratio (SNR) measurement. The denominator can also be the total power of all the signals the mobile phone 16 is receiving. This type of measurement is called a signal-to-interference ratio (SIR) measurement. For both SNR and SIR measurements, the value of the denominator will be the same for all measurements taken at a single location.

If SNR or SIR measurements are taken, one technique that may be used to solve for the mobile location and path loss exponent is the use of difference equations. Difference equations can be used to eliminate the unknown denominator in SIR or SNR measurements as follows. A reading from one base station is divided by the reading from another base station. Since the denominator values for each measurement are the same, they cancel and the result is the ratio of the received signal powers from the two base stations. When this result is expressed in dB, it is equal to the difference of the received base station signal powers, expressed in dB. The processing unit 10 then uses the channel model equations for each cell to form an equation for this difference that is a function of the (x,y) position of the mobile phone 16 and the path loss exponent. The mobile position and path loss exponent will then be solved from this set of equations.

The following example illustrates how the location of a mobile phone 16 may be found in accordance with one embodiment of the invention. In the example, SIR measurements are taken by the mobile phone 16. The log-distance path loss model is used to model all the channels between the mobile phone 16 and the base stations. The Taylor-series estimation procedure is used to solve the equations. The processing unit 10 preferably uses different channel model equations to characterize the received signals from the base stations depending on which cell the mobile phone 16 is in and also depending on which channel is being used by the mobile phone 16 to communicate with a base station. A different algorithm for solving the channel equations could also be used for each cell or group of cells or for each channel or group of channels.

The SIR from base station i can be expressed as $$SIR_i = \frac{P_{r,i}}{P_{tot}} \quad (1)$$

where $P_{r,i}$ is received power on the forward channel from base station i and $P_{tot}$ is the total received power on the forward channel. The forward channel is the channel used by the base station to transmit information to the mobile phone 16.

The received power from base station i can be modelled using the log-distance model given in Equation 2.

$$P_{r,i} = P_{t,i} - \overline{PL}_i \quad (2)$$

The term $P_{t,i}$ is the transmitted power from base station i and $\overline{PL}_i$ is the average path loss of the channel. All terms are in dB.

The formula for average path loss in dB at some distance $d_i$ from the base station i is given in Equation 3.

$$PL_i = \overline{PL}_o + 10n \log\left(\frac{d_i}{d_o}\right) \quad (3)$$
$$= \overline{PL}_o + 10n \log(d_i) - 10n \log(d_o)$$

The term $\overline{PL}_o$ is the average path loss in dB at some reference distance $d_o$ and n is the path loss exponent.

Combining Equations 2 and 3 with Equation 1, $SIR_i$ in dB can be rewritten as $$SIR_{i,dB} = P_{t,i} - \overline{PL}_o + 10n \log(d_o) - P_{tot} - 10n \log(d_i). \quad (4)$$

Difference equations are now used to eliminate the unknown denominator $P_{tot}$. They can also eliminate several other unknowns using the following simplifying assumptions. It can be assumed that the path loss $\overline{PL}_o$ at distance $d_o$ and the path loss exponent n is the same for each of the forward channels between the mobile phone 16 and the base stations. Assuming also that each base station is transmitting at the same power, the difference equations can be written as Equation 5.

$$SIR_{i,dB} - SIR_{j,dB} = 10n \log(d_j) - 10n \log(d_i) \quad (5)$$

The difference equation can be expressed as a function of the path loss exponent, the position of the mobile phone 16 (x,y), the known position of base station i, $(x_i, y_i)$, and the known position of base station j, $(x_j, y_j)$.

$$SIR_{i,db} - SIR_{j,db} = 10\frac{n}{2}\log\left(\frac{(x-x_j)^2 + (y-y_j)^2}{(x-x_i)^2 + (y-y_i)^2}\right) \quad (6)$$

Since the positions of base station i and j are known, Equation 6 is a function f(x,y,n) of the unknown (x,y) position of the mobile phone 16 and the path loss exponent n.

The method used to solve for the three unknowns is Taylor-Series estimation. The method is based on approximating the function with the first two terms of the Taylor series. Equation 7 shows this approximation evaluated at the values $x_o$, $y_o$ and $n_o$.

$$f_k a_{k1}\delta_x + a_{k2}\delta_y + a_{k3}\delta_n = m_k - e_k \quad (7)$$

Where $e_k$ is an error term and the other terms are defined as $$f_k = f(X_o, y_o, n_o) \quad a_{k1} = \left.\frac{\delta fk}{\delta x}\right|_{x_o,y_o,n_o} \quad (8)$$

$$a_{k2} = \left.\frac{\delta fk}{\delta y}\right|_{x_o,y_o,n_o} \quad a_{k3} = \left.\frac{\delta fk}{dn}\right|_{x_o,y_o,n_o}$$

The term mk is defined as the difference of the measured SIR from base station i and base station j. All possible difference equations are used, so the index k ranges from 1 to $N = C^t_2$ where t is the total number of SIR measurements taken by the mobile phone 16. The term $C^t_2$ denotes the number of possible combinations of 2 base stations out of a total number of t base stations.

The system of equations for all of the measured values can be expressed in matrix $$A\Delta = z - e \quad (9)$$

where $$A = \begin{bmatrix} a_{11} & a_{12} & a_{13} \\ a_{21} & a_{22} & a_{23} \\ \vdots & \vdots & \vdots \\ a_{N1} & a_{N2} & a_{N3} \end{bmatrix} \quad \Delta = \begin{bmatrix} \delta_x \\ \delta_y \\ \delta_n \end{bmatrix} \quad (10)$$

$$z = \begin{bmatrix} M_1 - f_1 \\ M_2 - f_2 \\ \vdots \\ m_N - f_N \end{bmatrix} \quad e = \begin{bmatrix} e_1 \\ e_2 \\ \vdots \\ e_N \end{bmatrix}$$

Taylor-series estimation is an iterative method. For each iteration, the vector A is solved for using the least squares solution for an inconsistent system shown in Equation 11.

$$\Delta = [A^T A]^{-1} A^T Z$$

Once A has been solved for, $\delta_x$ is added to $x_o$, $\delta_y$ is added to $y_o$ and $\delta_n$ is added to $n_o$. The iteration is repeated with A and z being recalculated with the new values of $x_o$, $y_o$ and $n_o$. This process continues until the A vector is essentially zero. At that point, $x_o$, $y_o$ and $n_o$ are given by the prediction algorithm.

There are several enhancements to the manner of operation of the processing unit that will improve its operation. These improvements are listed below.

Unless otherwise stated, these improvements are implemented with the software run on the computer processor in the processing unit 10.

In one embodiment of the invention, the processing unit 10 is given the signal strength measurements for each mobile phone 16 only as they become available from the mobile phone 16. In another improvement, the processing unit 10 requests signal strength measurements for a particular mobile phone 16 from the MSC or the base stations. If necessary, the software in the mobiles, the MSC and the base stations would be changed to implement this. This change would require exact knowledge of the cellular system software and will depend on the cellular system. However, anyone familiar with the equipment of the specific cellular system, the manufacturer for example, should be able to make the change with minimum effort.

One source of error for the location of mobile phones by the described methods is channel fading. Channel fading can cause the measured signal strength to differ a great deal from the value predicted by the channel model equations. This difference can result in a large error in the mobile position predicted by the algorithm. In order to reduce the effects of small-scale fading, the processing unit 10 averages several signal readings of the same base station together. The measurements will all be taken by the mobile phone 16 over a relatively small area. The average of the measurements will then be used in the channel equations.

In the example above, a single path loss exponent was assumed for all the channels between the mobile phone 16 and the base stations. In some cases, the path loss exponent on some of the channels could be very different from the others. If this occurs, solving a single exponent value for all the channels will result in a large error in the position estimate. In order to reduce this error, the processing unit 10 may divide the base stations into several groups. A path loss exponent is then solved for each group by the processing unit 10. The number of possible groups will be limited by the number of measurements available from the mobile phone 16.

In many cellular systems, directional antennas are used to divide the cells into sectors. This means that at a given location, the antenna gains of each of the surrounding base stations will be different due to different alignment and tilting of the antennas. However, by making use of radiation pattern measurements supplied by the antenna manufacturer and the known orientation of each antenna, the antenna gain pattern for each of the base stations can be determined. The processing unit 10 can then use these patterns to determine more accurate antenna gains to be used in the channel equations. If necessary, measurements can be conducted on the base station antennas to obtain a more accurate antenna gain pattern.

Due to the hostile nature of the radio channel, there will always be some error in the position estimates calculated by the processing unit 10. In order to reduce error, the processing unit 10 can employ a curve fitting algorithm that uses the calculated positions of the mobile phone 16 as points on the curve. The curve fitting algorithm will find the path that best satisfies all the points. This will reduce the effect of a few position estimates with large error and give a more accurate estimate of the actual path of the mobile phone 16.

Errors in the position estimates of the processing unit 10 can be due to one or two base stations having very different channels to the mobile phone 16 than all the other stations. This might be due to an obstruction between the mobile phone 16 and those base stations. The processing unit 10 can overcome this by finding a solution for the position of the mobile phone 16 several times, each time leaving out signal strength measurements from a different base station or group of base stations. The resulting measurements could then be processed to reduce the error due to the obstructed base station or group of base stations. For example, the average of all the solutions could be taken and used for the final answer.

The prediction algorithm used to find initial values for the algorithm that solves the signal strength equations can also be used to reduce the errors of the position estimates. Using the predicted velocity and position of the mobile phone 16, an approximate area is defined that should contain its next location. If the algorithm solving the signal strength equations diverges, giving a position estimate outside this area, the location estimate can be discarded and not used.

A prediction algorithm can also be used to discard signal strength measurements that are obviously in error. Prediction can be used to determine a reasonable estimate of what the next signal strength measurements should be. If the measurements disagree greatly with these estimates, they are discarded and not used in the signal strength equations.

A person skilled in the art could make immaterial modifications to the invention described in this patent document without departing from the essence of the invention that is intended to be covered by the scope of the claims that follow.

The embodiments of the invention in which an exclusive property or privilege is claimed are defined as follows:

1. Apparatus for locating a mobile phone in a cellular phone system, in which the cellular phone system comprises plural base stations, each base station being associated with a cell, wherein signal power in the cell decays exponentially with distance from the base station in accordance with a path loss exponent, and in which the mobile phone is equipped with a receiver, a received signal strength meter operably connected to the receiver, and a transmitter operably connected to the received signal strength meter for transmitting received signal strength measurements indicative of the strength of signals received by the mobile phone from the base stations, the apparatus comprising:

a processing unit operably connected to the plural base stations by first communications links, the processing unit having as input the received signal strength measurements, the processing unit being programmed to operate upon the received signal strength measurements to solve a channel model equation in which the position of the mobile phone and the path loss exponent of the cell are unknowns and produce as output position location signals representing the position of the mobile phone in the cell; and a user interface operably connected to the processing unit by a second communication link for communicating signals indicative of the position of the mobile phone in the cell, wherein the channel model equation for a given base station i, and given channel, comprises the equation:

$$SIR_{i,dB} = P_{t,i} - \overline{PL_o} + 10n \log(d_o) - P_{tot} - 10n \log(d_i)$$

where $SIR_{i,dB}$ is the signal-to-interference ratio of signals received at the mobile phone from the given base station i, $P_{t,i}$ is transmitted power from base station i, $\overline{PL_o}$ is the average path loss in dB at some reference distance $d_o$, $P_{tot}$ is the total received power on the channel, n is the path loss exponent and $d_i$ is the distance of the mobile phone from the given base station i.

2. The apparatus of claim 1 in which the processing unit is programmed to eliminate unknown variables in the channel model equation other than the location of the mobile phone and the path loss exponent.

3. The apparatus of claim 3 in which the processing unit is programmed to use difference equations to eliminate unknown variables in the channel model equation other than the location of the mobile phone and the path loss exponent.

4. The apparatus of claim 2 in which the processing unit is programmed to solve the channel model equation by Taylor-series estimation.

* * * * *